(12) United States Patent
Joo et al.

(10) Patent No.: US 10,690,323 B2
(45) Date of Patent: Jun. 23, 2020

(54) TARGET-ORIENTED LIGHT EMITTING DEVICE, AND OPTICAL MODULE

(71) Applicant: LG INNOTEK CO., LTD., Seoul (KR)

(72) Inventors: Yang Hyun Joo, Seoul (KR); Chang Hyuck Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 37 days.

(21) Appl. No.: 16/072,441

(22) PCT Filed: Jan. 24, 2017

(86) PCT No.: PCT/KR2017/000799
§ 371 (c)(1),
(2) Date: Jul. 24, 2018

(87) PCT Pub. No.: WO2017/131405
PCT Pub. Date: Aug. 3, 2017

(65) Prior Publication Data
US 2019/0032900 A1 Jan. 31, 2019

(30) Foreign Application Priority Data

Jan. 28, 2016 (KR) ........................ 10-2016-0010614

(51) Int. Cl.
*F21V 19/02* (2006.01)
*F21V 5/04* (2006.01)
(Continued)

(52) U.S. Cl.
CPC ............. *F21V 19/02* (2013.01); *F21V 5/008* (2013.01); *F21V 5/04* (2013.01); *F21V 14/02* (2013.01);
(Continued)

(58) Field of Classification Search
CPC . F21V 19/02; F21V 5/008; F21V 5/04; F21V 14/02; F21V 14/06; F21V 17/02;
(Continued)

(56) References Cited

U.S. PATENT DOCUMENTS

2006/0222207 A1 10/2006 Balzer et al.
2012/0155102 A1 6/2012 Melzner et al.

FOREIGN PATENT DOCUMENTS

JP 09-230284 A 9/1997
JP 2001-194604 A 7/2001
(Continued)

OTHER PUBLICATIONS

English translation of JP 2001-194604 A to Ricoh Co., LTD (Year: 2001).*

(Continued)

*Primary Examiner* — Anh T Mai
*Assistant Examiner* — Hana S Featherly
(74) *Attorney, Agent, or Firm* — Saliwanchik, Lloyd & Eisenschenk

(57) ABSTRACT

An embodiment relates to a target-oriented light emitting device comprising: a light emitting part for emitting light; a light focusing part for focusing the light emitted from the light emitting part; a first light adjusting part to which the light focused by in the light focusing part is incident, adjusting the orientation direction of the light, and emitting the adjusted light; and a second light adjusting part disposed between the light focusing part and the first light adjusting part so as to adjust a focal position of the light incident to the first light adjusting part.

20 Claims, 2 Drawing Sheets

(51) Int. Cl.
*F21V 14/06* (2006.01)
*F21V 17/02* (2006.01)
*F21V 23/04* (2006.01)
*G02B 26/08* (2006.01)
*F21V 5/00* (2018.01)
*F21V 14/02* (2006.01)
*G02B 3/14* (2006.01)
*G02B 27/30* (2006.01)
*F21Y 115/10* (2016.01)

(52) U.S. Cl.
CPC .............. *F21V 14/06* (2013.01); *F21V 17/02* (2013.01); *F21V 23/0442* (2013.01); *G02B 26/0875* (2013.01); *F21Y 2115/10* (2016.08); *G02B 3/14* (2013.01); *G02B 27/30* (2013.01)

(58) Field of Classification Search
CPC ... F21V 23/0442; G02B 26/0875; G02B 3/14; G02B 27/30; F21Y 2115/10

USPC ........................................................ 362/235
See application file for complete search history.

(56) References Cited

FOREIGN PATENT DOCUMENTS

| KR | 10-2004-0055014 A | 6/2004 |
| KR | 10-2013-0042788 A | 4/2013 |
| KR | 10-2015-0032446 A | 3/2015 |
| WO | WO-2006/037222 A1 | 4/2006 |

OTHER PUBLICATIONS

International Search Report in International Application No. PCT/KR2017/000799, filed Jan. 24, 2017.

* cited by examiner

TARGET-ORIENTED LIGHT EMITTING DEVICE, AND OPTICAL MODULE

CROSS-REFERENCE TO RELATED APPLICATIONS

This application is the U.S. national stage application of International Patent Application No. PCT/KR2017/000799, filed Jan. 24, 2017, which claims priority to Korean Application No. 10-2016-0010614, filed Jan. 28, 2016, the disclosures of each of which are incorporated herein by reference in their entirety.

TECHNICAL FIELD

Embodiments relate to target-oriented light-emitting devices and optical modules.

BACKGROUND ART

LIDAR (light detection and ranging) is remote analysis technology using light, and is analogous in operating principle to RADAR (radio detection and ranging), which is generally well known.

RADAR is configured to determine the distance to an object, the direction and height of an object, and the like in such a manner as to cause an electromagnetic wave as large as a microwave to be reflected at an object and to receive the reflected electromagnetic wave from the object. Meanwhile, LIDAR is configured to obtain distance information and physical property information of a measurement target object using light such as visible light and infrared light, and is thus employed in precise distance measurement.

In recent years, LIDAR has also come to be used in detecting a neighboring object around a vehicle by scanning the object in three dimensions for the purpose of autonomous traveling or valet parking of a vehicle. In particular, it is necessary to radiate light at a desired angle in order to precisely detect even a small object located at a long distance.

TECHNICAL OBJECT

Embodiments provide a target-oriented light-emitting device and an optical module, which are able to control a divergence angle of light radiated to an object.

TECHNICAL SOLUTION

An embodiment provides a target-oriented light-emitting device including a light-emitting unit for emitting light, a light-focusing unit for focusing the light emitted from the light-emitting unit, a first light adjuster on which the light focused at the light-focusing unit is incident, the first light adjuster adjusting an emission direction of the light, and a second light adjuster disposed between the light-focusing unit and the first light adjuster so as to control the focal position of the light that is incident on the first light adjuster.

For example, the first light adjuster may be moved in linkage with the second light adjuster so as to determine the divergence angle of the light emitted from the first light adjuster.

For example, the second light adjuster may include at least one of a liquid lens, a liquid crystal lens and a polymer lens.

For example, a first surface of the second light adjuster may be configured to be convex toward the light-focusing unit and to be concave toward the first light adjuster. For example, the target-oriented light-emitting device may further include a drive unit for moving the first light adjuster.

For example, the first light adjuster may include a lens group composed of two or more lenses.

For example, the lens group may include a first lens, a second lens and a third lens.

For example, the first light adjuster may be driven in a first direction and/or a second direction.

For example, the target-oriented light-emitting device may further include a magnifying lens, on which the light emitted from the first light adjuster is incident. Another embodiment provides an optical module including the target-oriented light-emitting device, wherein the target-oriented light-emitting device is configured such that the light-emitting unit, the light-focusing unit, the second light adjuster and the first light adjuster are arranged on an optical axis in this order, and wherein the light-focusing unit includes at least one lens through which the light emitted from the light-emitting unit is transmitted.

ADVANTAGEOUS EFFECTS

The target-oriented light-emitting device and an optical module according to the embodiment are able to easily control the divergence angle of light radiated to an object using a simplified structure and to reduce manufacturing costs.

BEST MODE

Hereinafter, embodiments will be described in detail with reference to the accompanying drawings, in order to concretely describe the disclosure and to assist in understanding of the disclosure. However, the embodiments disclosed here may be altered into various other forms, and the scope of the disclosure should not be construed as being limited to the embodiments described below. The embodiments disclosed here are provided in order to more completely describe the disclosure to those of ordinary skill in the art.

In the following description of the embodiments, it will be understood that, when an element is referred to as being formed "on" or "under" another element, it can be directly "on" or "under" the other element, or can be indirectly disposed, with one or more intervening elements therebetween. In addition, it will also be understood that "on" or "under" the element may mean an upward direction or a downward direction based on the element.

In addition, relative terms such as, for example, "first", "second", "on/upper/above" and "beneath/lower/below", used in the following description may be used to distinguish any one substance or element with another substance or element without requiring or containing any physical or logical relationship or sequence between these substances or elements.

Figure 1A:
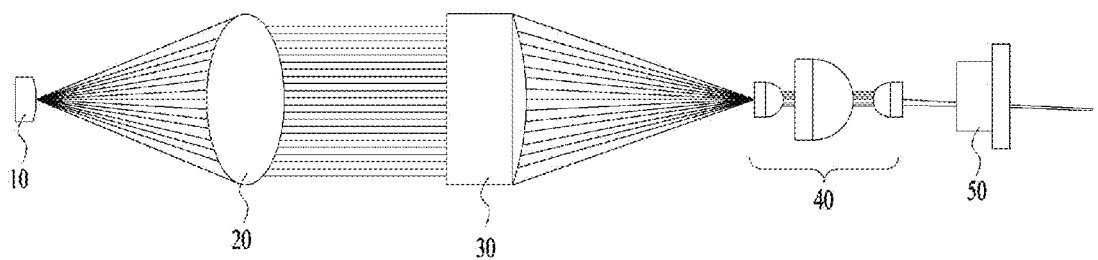
FIGS. 1a to 1c are views illustrating dimensions of a divergence angle when a light adjuster of a target-oriented light-emitting device moves in the x-axis direction, in the y-axis direction or in the z-axis direction.
Figure 1B:
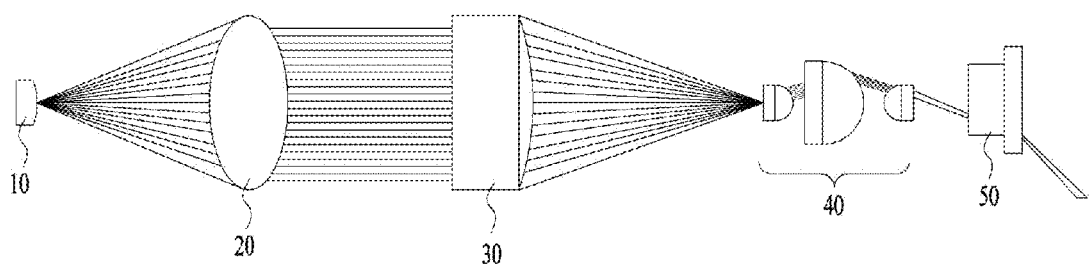
Figure 1C:
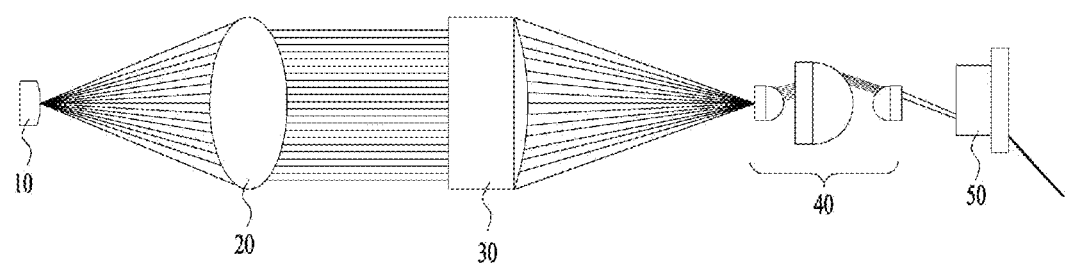

FIGS. 1a to 1c are views illustrating magnitudes of a divergence angle when a light adjuster of a target-oriented light-emitting device moves in the x-axis direction, in the y-axis direction or in the z-axis direction.

The target-oriented light-emitting device may include a light-emitting unit 10, a light-focusing device 30 and a light adjuster 40. The target-oriented light-emitting device may further include a collimator 20 and/or a magnifying lens 50.

FIG. 1a is a view illustrating an example in which a divergence angle of light emitted from the magnifying lens 50 is 0.5° when the center of the light adjuster 40 is disposed at the reference position (for example, the optical axis). When the light adjuster 40 is displaced by −1 mm in the y-axis direction from the position shown in FIG. 1a, as illustrated in FIG. 1b, the divergence of light increases to 3.54°. Meanwhile, when the light adjuster 40 is displaced by −0.03 mm in the z-axis direction as illustrated in FIG. 1c, the divergence angle of light may decrease to 0.5°.

In order to control the traveling direction and divergence angle of light radiated to an object, an actuator configured to drive the light adjuster 40 in the three axial directions (the x-axis direction, the y-axis direction and the z-axis direction) may be used.

Figure 2:
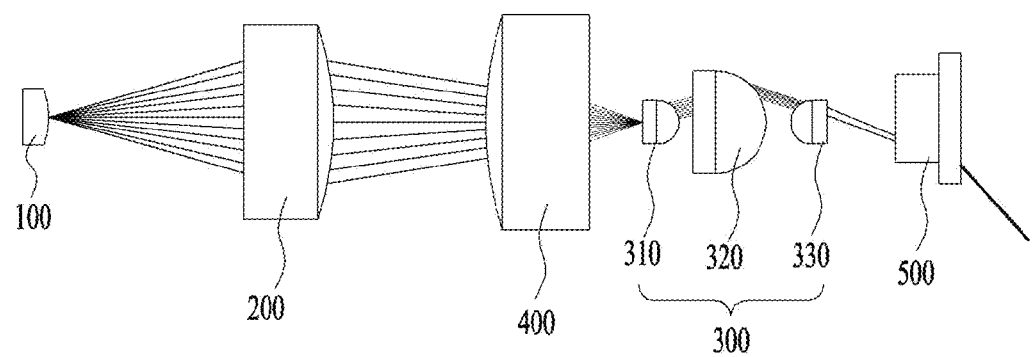
FIGS. 2 and 3 are views illustrating a target-oriented light-emitting device according to an embodiment.
Figure 3:
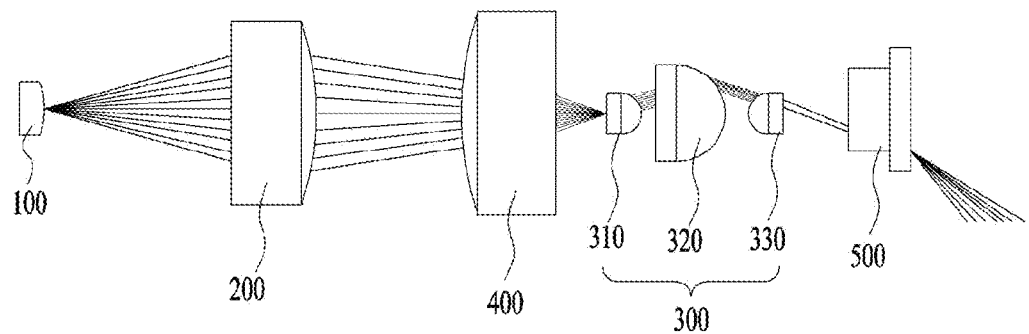

FIGS. 2 and 3 are views illustrating a target-oriented light-emitting device according to an embodiment.

Referring to FIGS. 2 and 3, the target-oriented light-emitting device according to the embodiment includes a light-emitting unit 100, a light-focusing unit 200, a first light adjuster 300 and a second light adjuster 400, and may further include a magnifying lens 500.

The light-emitting unit 100 may emit a laser beam, and may include at least one light source.

The at least one light source 100 functions to emit light. If the central wavelength of light emitted from the at least one light source 100 is greater than 2 μm, the light may not be appropriate for the detection of light waves and distance measurement because the light is far-infrared light. On the other hand, if the central wavelength of light emitted from the at least one light source 100 is less than 0.2 μm, the beam emitted from an optical transport unit may be harmful to human body, and the beam may have difficulty reaching an object located a long distance away because the beam is absorbed by extraneous substances during transmission to the object (or physical body or material). Accordingly, the central wavelength emitted from the at least one light source 100 may be 02 μm to 2 μm, but the embodiment is not limited thereto.

Here, the object may be may be a physical body which is floating in the air or is placed on the ground, or may be a particle floating in the air. The embodiment is not limited to any specific kind of object.

Furthermore, the wavelength distribution of the at least one light source 100 may be 1 μm or less.

Furthermore, the at least one light source 100 may be a pulse-shaped light source element having a constant duty rate. The on time of the pulse may be 1 nm or greater. The pulse may have the shape of a rectangular wave, triangular wave, sawtooth wave, sine curve, delta function or sinc function. The pulse period may be constant or may be variable.

The at least one light source 100 may be a light source element having one or more spatial modes. Here, the spatial mode may be represented by an n-th order of a Gaussian mode or a Lambertian mode, wherein n is 1 or greater.

The at least one light source 100 may be a light source element which may be represented by the sum of linear polarized light or circular polarized light. Here, the ratio of polarization components may be represented by 1:A based on one polarization component, wherein A is 1 or less.

Although the light-emitting unit may include one light source 100 disposed therein, the embodiment is not limited thereto. In some embodiments, the light source 100 may include a plurality of light sources. When the at least one light source 100 includes a plurality of light sources, the plurality of light sources may be of the same kind or different kinds.

The light-focusing unit 200 may be able to focus light emitted from the light-emitting unit 100. The light-focusing unit 200 may be composed of one or more optical members or lenses. When the light-focusing unit 200 is composed of a single lens, a lens of + power may constitute the light-focusing unit. When a plurality of optical members or lenses constitute the light-focusing unit, the light-focusing unit may be composed of a collimator part configured to form parallel light and a focusing part. In this case, the parallel light may be formed through the collimator part, and may then be focused through the focusing part.

The optical members or lenses disposed in the light-focusing unit 200 may be made of translucent resin material having high transmissivity, and may be made of material capable of decreasing the loss of light which is incident thereon from the light source. Although the optical members of lenses may, for example, include at least one of polycarbonate, acryl and polymethylmethacrylate (PMMA), the embodiment is not limited thereto.

The light emitted from the light-focusing unit 200 may be refracted and focused, and may then be transmitted to a first light adjuster or a second light adjuster. As described above, when the traveling direction and divergence angle of light is controlled by driving three axes (for example, the x-axis, the y-axis and the z-axis) of the first light adjuster without the second light adjuster, the light may be transmitted to the first light adjuster from the light-focusing unit without passing through the second light adjuster.

The first light adjuster 300 may be driven in the first direction and/or the second direction. For example, the first light adjuster 300 may be driven in the x-axis direction and the y-axis direction. Consequently, the first light adjuster 300 may be driven at the plane coordinates defined by the x-axis and the y-axis. Since the first light adjuster is driven in the two axial directions, the traveling direction of light may be controlled. Furthermore, the first light adjuster 300 may be driven in three axial directions (for example, the x-axis direction, the y-axis direction and the z-axis direction). The driving in the three axial directions may further include driving in the direction perpendicular to the plane defined by the above-mentioned two axes, in addition to the driving in the two directions. Consequently, the first light adjuster may be driven in the three-dimensional space such that the traveling direction of light is controlled by driving in the two axial directions and the divergence angle is controlled by driving in the additional axis direction.

The first light adjuster 300 may be composed of a liquid lens, a tunable lens or the like. When the first light adjuster is composed of a general plastic lens or a glass lens, the focal length may be controlled by driving in the above-mentioned axis direction. Meanwhile, when the first light adjuster is composed of the liquid lens, the tunable lens or the like, the focal length can be controlled without driving in the axis direction, thereby making it unnecessary to perform driving in the axis direction.

Although the traveling direction and divergence angle of light may be controlled by driving in the three axial directions, there is difficulty in that the configuration and driving of the actuator are complicated. Accordingly, the divergence angle may be efficiently controlled by providing the second light adjuster, which is capable of controlling the divergence angle, in addition to the first light adjuster 300 capable of performing driving in the two axial directions.

The target-oriented light-emitting device according to the embodiment may further include a drive unit (not shown) configured to move the first light adjuster 300 in the first and second directions.

The second light adjuster 400 may be disposed between the light-focusing unit 200 and the first light adjuster 300.

Here, the first, second and third directions may intersect one another. For example, the first direction may be the x-axis direction, the second direction may be the y-axis direction and the third direction may the z-axis direction.

In order to detect a target such as a physical body by radiating light to the target, a desired magnitude of divergence angle may be determined by considering the distance to the target and the size of the target.

The magnitude of divergence angle may be increased when the size of the target is large and the distance to the target is great, and there is a necessity to decrease the magnitude of divergence angle when the size of the target is small and the distance to the target is small.

According to the embodiment, the divergence angle of light emitted from the first light adjuster 300 or a diffusing unit (diffusing lens) may be controlled or determined by driving the first light adjuster 300 in linkage with the second light adjuster 400.

For example, the target-oriented light-emitting device according to the embodiment needs to maintain the divergence angle at an angle of 0.5° or less in order to detect a target that has a width or height of 10 cm and is located at a distance of 30 m.

The first light adjuster 300 may be moved in one of the x-axis direction and the y-axis direction by means of the drive unit. As the first light adjuster 400 is moved in linkage with the second light adjuster 400, the focal length of the second light adjuster 400 may vary, thereby controlling the magnitude of divergence angle of light emitted from the first light adjuster 300. In other words, the divergence angle of light may vary by driving the first light adjuster, and variation in the divergence angle may be corrected or complemented for by means of the second light adjuster.

The drive unit may drive the first light adjuster 300 in linkage with the second light adjuster 400 so as to decrease a divergence angle, thereby causing the focal length of the second light adjuster 400 to be 10 mm or less. Meanwhile, the drive unit may drive the first light adjuster 300 in linkage with the second light adjuster 400 so as to increase a divergence angle, thereby causing the focal length of the second light adjuster 400 to be 11 mm or greater.

When the first light adjuster 300 is moved in at least one direction of the x-axis direction and the y-axis direction, the focal length of the second light adjuster 400, which is moved in linkage with the first light adjuster 300, may vary, and the magnitude of divergence angle of light emitted from the first light adjuster 300 may be controlled.

Although the second light adjuster 400 may include at least one of a plastic lens, a glass lens, a liquid lens, a liquid crystal lens and a polymer lens, the second light adjuster 400 is not limited thereto, as long as the focal length of the lens can be varied by changing an external signal.

In the embodiment, the liquid lens, which is provided as the lens of the second light adjuster 400, may change the curvature between liquid through variation of voltage, and may thus control the focal length of light passing through the second light adjuster. For example, the liquid lens may be prepared in such a manner as to charge two kinds of liquid, which have different refractive indexes and which are immiscible with each other, into a cylinder and to hermetically plug the upper and lower ends of the cylinder with first and second transparent plates so as to enable the resulting cylinder to function as a lens.

One of the two kinds of liquid is oil which has an insulation property and non-polarity, and the other is an aqueous solution in which an electrolyte material capable of allowing electricity to flow therethrough is dissolved. Here, in order not to be affected by gravity, two kinds of liquid having the same density may be used.

The cylinder is coated with an electrode, and the electrode is coated with an insulating material so as to inhibit electric current from flowing through the liquid contained in the cylinder.

The electrode is wired to the cylinder, and an electrode, which has a polarity opposite the polarity of the electrode wired to the cylinder, is connected to a plate in the conductive aqueous solution. Accordingly, when a voltage applicator is connected to the electrode wired to the cylinder and to the electrode having the polarity opposite the polarity of the electrode wired to the cylinder, the resulting structure serves as a capacitor.

When a voltage is applied to the liquid contained in the cylinder, the surface tension of the conductive aqueous solution varies, and the curvature between the two kinds of liquid is thus changed, with the result that the liquid serves as a lens for refracting light.

The liquid lens, which is provided as the lens of the second light adjuster 400, is able to control the path of incident light according to position by employing the difference in refractive index between the material constituting the lens and the air. When different voltages are applied to the positions of the liquid crystal layer so as to drive the liquid crystal layer using different electric fields generated at the positions, the light, which is incident on the liquid crystal layer, is subjected to different phase variations at different positions, with the result that the liquid crystal layer is able to control the path of incident light like a conventional lens.

The first surface of the second light adjuster 400 may be configured to be convex toward the light-focusing unit 200 and to be concave toward the first light adjuster 300.

The first light adjuster 300 may include a lens group composed of two or more lenses.

The lens group may include a first lens 310, a second lens 320 and a third lens 330.

The target-oriented light-emitting device may further include the magnifying lens 500 functioning to magnify the output angle of the light which is incident thereon from the first light adjuster 300.

The magnifying lens 500 may determine the angle of view of the light which is incident thereon and is then emitted therefrom. In the embodiment, the magnifying lens may realize an angle of view of 135° to 145°.

Although preferred embodiments have been illustrated and described, it should be understood that this disclosure is not limited to the above-described specific embodiments, and numerous other modifications and embodiments can be devised by those skilled in the art to which this disclosure belongs without departing from the spirit and scope of this disclosure. For example, various variations and modifications are possible in the component parts that have been concretely disclosed in the embodiments. In addition to variations and modifications in the component parts and/or arrangement thereof, alternative uses will also be apparent to those skilled in the art. Differences in the variations and modifications should be construed to fall within the scope of the disclosure defined by the accompanying claims.

MODE FOR INVENTION

Modes for the implementation of embodiments have sufficiently been described in the "best mode" described above.

INDUSTRIAL APPLICABILITY

The above-described target-oriented light-emitting device may be applied to various fields. For example, the target-oriented light-emitting device may be applied to optical modules, and the optical modules may be applied to automotive Lidar sensors, robot cleaners, and scanning sensors applied to Virtual-Reality (VR) and Augmented-Reality (AR) apparatuses.

The invention claimed is:

1. A target-oriented light-emitting device comprising;
  a light-emitting unit that emits light;
  a light-focusing unit that focuses the light emitted from the light-emitting unit;
  a first light adjuster on which the light focused by the light-focusing unit is incident, wherein the first light adjuster moves in a three-dimensional space by moving in three axial directions to adjust an emission direction of the light; and
  a second light adjuster disposed between the light-focusing unit and the first light adjuster so as to control a focal position of the light that is incident on the first light adjuster.

2. The target-oriented light-emitting device according to claim 1, wherein the first light adjuster is moved in linkage with the second light adjuster so as to determine a divergence angle of the light emitted from the first light adjuster.

3. The target-oriented light-emitting device according to claim 1, wherein the second light adjuster includes at least one of a liquid lens, a liquid crystal lens, and a polymer lens.

4. The target-oriented light-emitting device according to claim 1, wherein a first surface of the second light adjuster is convex with respect to the light-focusing unit and concave with respect to the first light adjuster.

5. The target-oriented light-emitting device according to claim 1, comprising a drive unit that moves the first light adjuster.

6. The target-oriented light-emitting device according to claim 1, wherein the first light adjuster includes a lens group comprising two or more lenses.

7. The target-oriented light-emitting device according to claim 6, wherein the lens group includes a first lens, a second lens, and a third lens and wherein the light-focusing unit, the second light adjuster, the first lens, the second lens, and the third lens are disposed in one direction.

8. The target-oriented light-emitting device according to claim 1, wherein the first light adjuster is driven in a first axial direction or a second axial direction.

9. The target-oriented light-emitting device according to claim 1, comprising a magnifying lens on which light emitted from the first light adjuster is incident.

10. An optical module comprising;
  a target-oriented light-emitting device that comprises a light-emitting unit that emits light, a light-focusing unit that focuses the light emitted from the light-emitting unit, a first light adjuster on which the light focused by the light-focusing unit is incident, wherein the first light adjuster moves in a three-dimensional space by moving in three axial directions to adjust an emission direction of the light, and a second light adjuster disposed between the light-focusing unit and the first light adjuster so as to control a focal position of the light that is incident on the first light adjuster;
  wherein the light-emitting unit, the light-focusing unit, the second light adjuster, and the first light adjuster are arranged on an optical axis in this order, and
  wherein the light-focusing unit includes at least one lens through which the light emitted from the light-emitting unit is transmitted.

11. The target-oriented light-emitting device according to claim 1, wherein a plurality of the light-focusing units is provided, and each light-focusing unit includes a collimator part forming parallel light and a focusing part.

12. The target-oriented light-emitting device according to claim 1, wherein the first light adjuster includes a liquid lens or a tunable lens.

13. A target-oriented light-emitting device comprising;
  a light-emitting unit that emits light;
  a light-focusing unit that focuses the light emitted from the light-emitting unit;
  a first light adjuster on which the light focused by the light-focusing unit is incident, wherein the first light adjuster moves in a three-dimensional space by moving in three axial directions to adjust an emission direction of the light in at least one of a first direction and a second direction; and
  a second light adjuster disposed between the light-focusing unit and the first light adjuster so as to adjust an emission direction of the light in a third direction,
  wherein the first, second, and third directions intersect one another.

14. The target-oriented light-emitting device according to claim 13, wherein the first light adjuster is moved in linkage with the second light adjuster so as to determine a divergence angle of the light emitted from the first light adjuster.

15. The target-oriented light-emitting device according to claim 13, wherein the second light adjuster includes at least one of a liquid lens, a liquid crystal lens, and a polymer lens.

16. The target-oriented light-emitting device according to claim 13, wherein a first surface of the second light adjuster is convex with respect to the light-focusing unit and concave with respect to the first light adjuster.

17. The target-oriented light-emitting device according to claim 13, comprising a drive unit that moves the first light adjuster to the first axial direction and the second axial direction.

18. The target-oriented light-emitting device according to claim 13, wherein the first light adjuster includes a lens group comprising two or more lenses.

19. The target-oriented light-emitting device according to claim 18, wherein the lens group includes a first lens, a second lens, and a third lens and wherein the light-focusing unit, the second light adjuster, the first lens, the second lens, and the third lens are disposed in one direction.

20. The target-oriented light-emitting device according to claim 13, comprising a magnifying lens on which the light emitted from the first light adjuster is incident.

* * * * *